United States Patent
Schuellein et al.

(10) Patent No.: US 6,631,064 B2
(45) Date of Patent: Oct. 7, 2003

(54) APPARATUS AND METHOD FOR PROVIDING OVERCURRENT PROTECTION FOR SWITCH-MODE POWER SUPPLIES

(75) Inventors: George Schuellein, Narragansett, RI (US); Michael Xintao Wang, Warwick, RI (US); Gedaly Levin, Columbia, MD (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 96 days.

(21) Appl. No.: 09/777,241

(22) Filed: Feb. 6, 2001

(65) Prior Publication Data

US 2002/0105767 A1 Aug. 8, 2002

(51) Int. Cl.[7] .............................. H02H 3/08; H02H 9/02
(52) U.S. Cl. ...................................................... 361/93.1
(58) Field of Search ........................... 361/93, 18, 100, 361/115, 93.1; 363/50, 56.07, 56.03

(56) References Cited

U.S. PATENT DOCUMENTS

| | | | | | |
|---|---|---|---|---|---|
| 5,012,401 A | * | 4/1991 | Barlage | ........................ | 363/97 |
| 5,469,002 A | * | 11/1995 | Garrett | ........................ | 307/150 |
| 5,773,966 A | * | 6/1998 | Steigerwald | ................. | 323/282 |
| 5,986,902 A | * | 11/1999 | Brcovic et al. | ................. | 363/50 |
| 6,127,814 A | * | 10/2000 | Goder | ......................... | 323/282 |
| 6,337,563 B2 | * | 1/2002 | Takimoto et al. | ............ | 323/284 |

OTHER PUBLICATIONS

LinFinity Microelectronics. LX1668 Production Data Sheet; Apr. 1999. p. 8.*

* cited by examiner

Primary Examiner—Gregory J. Toatley, Jr.
Assistant Examiner—Z Kitov

(57) ABSTRACT

An overcurrent protection apparatus (50) and method for switch-mode power supplies (10) immediately clamps the peak power supply current when a sensed current magnitude exceeds a threshold current magnitude, reduces the threshold current magnitude if the overcurrent condition persists, and automatically attempts a restart of the power supply (10) to normal operation.

11 Claims, 4 Drawing Sheets

APPARATUS AND METHOD FOR PROVIDING OVERCURRENT PROTECTION FOR SWITCH-MODE POWER SUPPLIES

FIELD OF THE INVENTION

The present invention relates to switch-mode power supplies. More particularly, the present invention relates to an apparatus and method for providing overcurrent protection for switch-mode power supplies.

BACKGROUND OF THE INVENTION

Most modern electronic devices employ switch-mode power supplies due to the high power efficiency and smaller physical size of these types of power supplies. Switch-mode power supplies are also advantageous in that these supplies can provide regulated output voltages having magnitudes higher or lower than the unregulated input supply, and also provide multiple outputs of differing voltage magnitudes.

When switch-mode power supplies are overloaded or short-circuited, excessively high currents can result in severe damage to the power supply components. Presently, switch-mode power supplies typically employ one of four known overcurrent protection schemes and concomitant circuitry. These schemes include the so-called pulse-by-pulse scheme, the hiccup current limit scheme, the foldback current limit scheme, and the latch off scheme.

The pulse-by-pulse scheme clamps the peak of the power supply output current when a sensed current magnitude exceeds a threshold current magnitude. The power supply output is inhibited by reducing the duty cycle of a power switching device. A drawback with this overcurrent protection scheme is the high tail current that continues circulating in the output filter of the power supply even after the duty cycle of the switching device is reduced. Thus the power supply components can be overheated and damaged.

The hiccup current limit scheme terminates power supply operation completely once an overcurrent condition is detected. After a predetermined time period, a restart of the power supply is attempted. Normal power supply operation is resumed if the overcurrent condition has cleared; however, if the overcurrent condition is still present, power supply operation is once again terminated. This scheme typically requires an unacceptably long time to recover once an overcurrent condition has cleared. Additionally, this scheme is not suitable for parallel operation of power supplies.

The foldback current current limit scheme causes the power supply maximum current limit to decrease with the power supply output voltage. In other words, when the power supply output voltage decreases due to an overload or short-circuit, the maximum current limit also decreases thus reducing the output current to a safe level. This scheme is difficult to implement in isolated switch-mode power supply designs, because the output voltage is not readily available to the current limiting circuitry, thus extra circuitry is required to implement this scheme. Another problem with this scheme is that the power supply can latch up under certain operating conditions.

The latch off protection scheme completely shuts down the power supply under an overcurrent condition. Normal operation can only be restored by cycling the input voltage (on/off) or toggling an ENABLE input. Thus, the power supply is not capable of automatically restarting.

Hence, there is a need in the art for an overcurrent protection scheme for switch-mode power supplies that effectively protects the power supply components when a sensed current magnitude exceeds a threshold current magnitude, and automatically attempts a restart of the power supply to normal operation, without the drawbacks of the known overcurrent protection schemes.

DETAILED DESCRIPTION OF THE DRAWINGS

Figure 1:
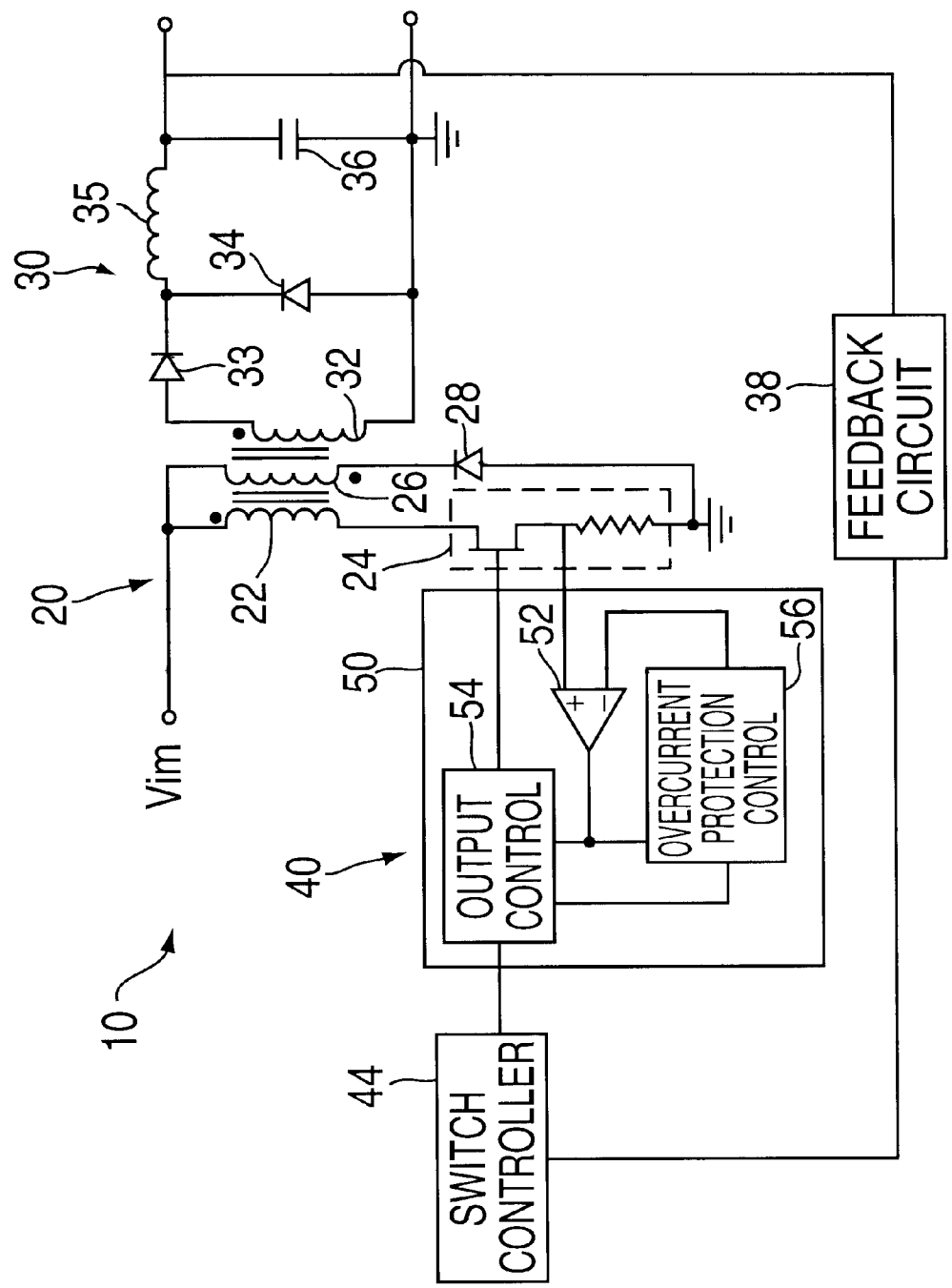
FIG. 1 depicts a funtional schematic diagram of a switch-mode power supply incorporating the overcurrent protection circuit of the present invention.

A functional schematic diagram of a switch-mode power supply 10 employing the overcurrent protection circuitry is depicted in FIG. 1. The depicted power supply 10 is a forward converter type power supply design, and like most forward converters it includes a primary circuit portion 20, a secondary circuit portion 30, and a control circuit portion 40. The power supply 10 depicted, which is a forward converter type design, is only one of many switch-mode power supply designs, and the current protection method, and concomitant circuitry for carrying out the method, is not limited to use in forward converter designs.

The primary circuit portion 20 includes a transformer primary winding 22, a controlled power switch 24, and a reset winding 26 with a series-connected diode 28. The transformer primary winding 22 is connected at one end to receive an input voltage, and at the other end to the controlled power switch 24. The function of each of these components is readily understood, and will not be discussed further.

The secondary circuit portion 30 includes a transformer secondary winding 32, first 33 and second 34 diodes, a filter circuit including an inductor 35 and a capacitor 36, and a feedback circuit 38. The diodes 33, 34, ensure current flows in a single direction from the secondary circuit output. The inductor 35 and capacitor 36 filter circuit smooths the DC voltage waveform at the output of the secondary circuit portion 30. The feedback circuit 38 sends a feedback signal to the control circuit portion 40. The purpose of the feedback signal will be further discussed below. The feedback circuit 38 is depicted as a block since it could take various forms. For example, the feedback circuit could include an opto-coupler, or any other device that provides electrical isolation between the secondary circuit portion 30 and the control circuit portion 40.

The control circuit portion 40 includes a switch controller 44, and an overcurrent protection circuit 50. As indicated, the overcurrent protection circuit 50 includes a comparator circuit 52, an output control circuit 54, and an overcurrent protection control circuit 56.

The switch controller 44 receives the feedback signal from the feedback circuit 38 and, in conjunction with the overcurrent protection circuit 50, controls the switching operation of the controlled power switch 24 on the basis of the feedback signal. Specifically, the switch controller 44 and overcurrent protection circuit 50 determine the duty cycle of the controlled power switch 24. The duty cycle of the controlled power switch 24, in turn, controls the current flow through the transformer primary winding 22. The current flow through the transformer primary winding 22 controls the current flow in the transformer secondary winding 32 and thus the output voltage magnitude. The switch controller 44 can be implemented in any one of several configurations; however, the switch controller 44 is typically a pulse width modulator (PWM) controller.

The overcurrent protection circuit 50 senses the magnitude of the current flow through the controlled power switch 24, which is indicative of the load current being supplied by the secondary circuit portion 20. The overcurrent protection circuit 50 compares the sensed current magnitude with a variable threshold current magnitude and, as stated above, controls the duty cycle of the controlled power switch 24 in conjunction with the switch controller 44. Although the depicted circuit arrangement for providing the sensed current magnitude utilizes a resistance to develop a voltage drop, numerous other circuit arrangements for detecting the sensed current magnitude may also be used. By way of a non-limiting example, a transformer could be used to provide the sensed current magnitude.

The overcurrent protection circuit 50 implements a so-called "soft hiccup" current limiting scheme by reducing the variable threshold current magnitude to a lower value after a specific delay period. As will be more fully discussed below, this delay period prevents triggering the soft hiccup during certain transient conditions. The overcurrent protection circuit 50 also provides for the automatic reset of the variable threshold current magnitude to the initial, higher value after certain, specific periods of time, which will also be more fully discussed herein below.

Figure 2:
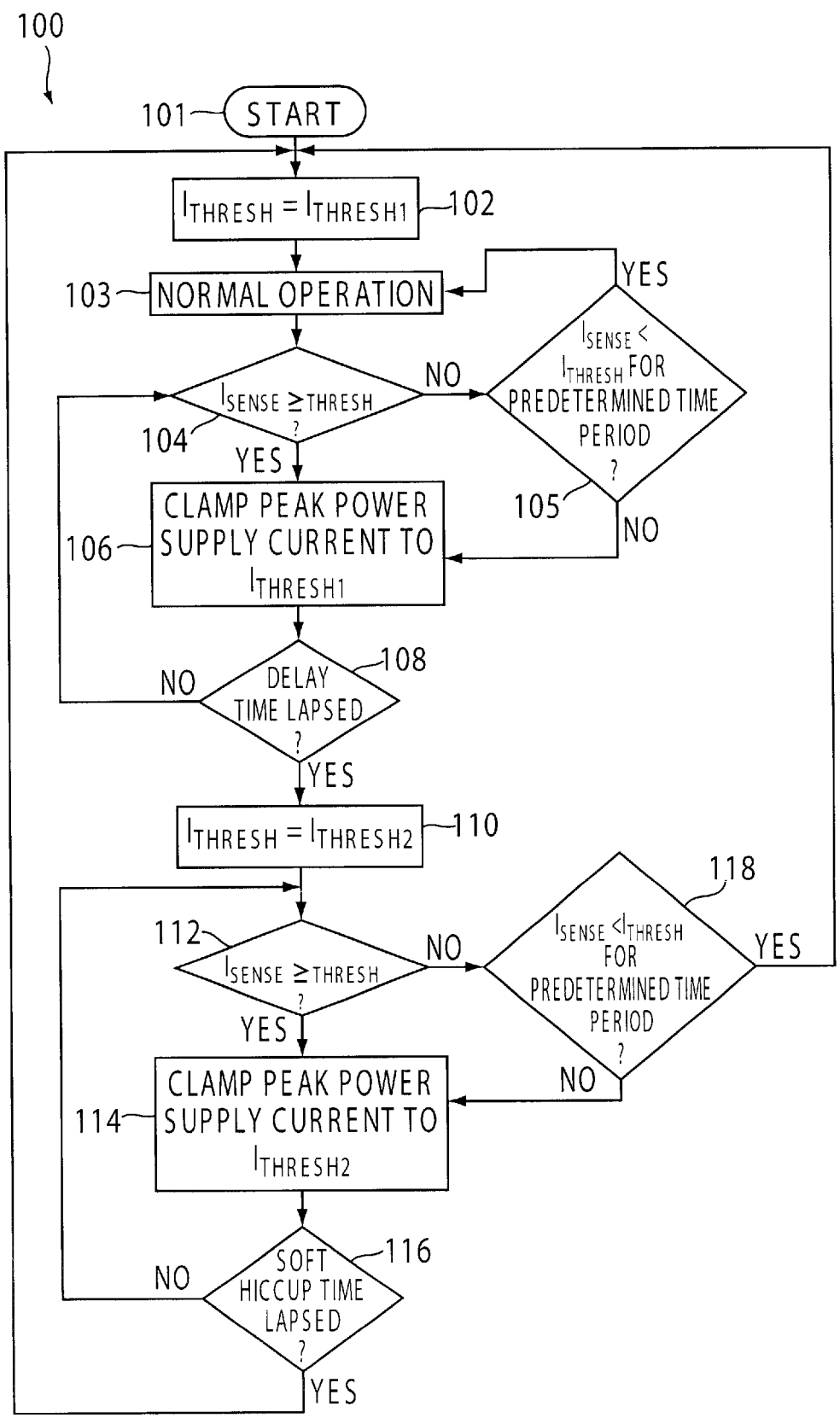
FIG. 2 is a flowchart depicting the methodological steps for carrying out the overcurrent protection scheme of the present invention.

With reference now to FIG. 2, the general methodology (100) for implementing the soft hiccup current limit scheme will be discussed. Upon start-up of the power supply 10 (STEP 101), the variable threshold current magnitude ($I_{THRESH}$) is set to a first value ($I_{THRESH1}$) (STEP 102), and normal operation commences (STEP 103). The comparator circuit 52 compares the sensed current magnitude ($I_{SENSE}$) with $I_{THRESH1}$, which is supplied and controlled by the overcurrent protection control circuit 56 (STEP 104). If $I_{SENSE}$ is less than $I_{THRESH}$, then the output of the comparator circuit 52 causes the output control circuit 54 to be configured such that gating signals generated by the switch controller 44 are passed, uninhibited, to the power switch 24. Thus, the power supply 10 operates normally (STEP 103).

Conversely, if $I_{SENSE}$ is greater than or equal to $I_{THRESH1}$ the comparator circuit 52 causes the output control circuit 54 to be configured such that the overcurrent control circuit 50 clamps the peak of the power supply current to $I_{THRESH1}$. More specifically, the output control circuit 54 causes the duty cycle of the power switch 24 to be reduced, thus current flow through the power supply is clamped (STEP 106). Additionally, if $I_{SENSE}$ is greater than or equal to $I_{THRESH1}$ for the above-mentioned delay time (STEP 108), the overcurrent control circuit 56 reduces the variable threshold current magnitude supplied to the comparator circuit 52 to a second value ($I_{THRESH2}$) (STEP 110). Alternatively, if $I_{SENSE}$ goes below $I_{THRESH1}$ during the delay time period and remains below $I_{THRESH1}$ for a predetermined time period (STEP 105), then normal operation continues.

If $I_{THRESH}$ is indeed changed from $I_{THRESH1}$ to $I_{THRESH2}$ in STEP 110, and $I_{SENSE}$ remains greater than or equal to $I_{THRESH2}$ (STEP 112), then the peak of the power supply current is clamped to the lower $I_{THRESH2}$ value (STEP 114).

If $I_{SENSE}$ goes below $I_{THRESH2}$ and remains below $I_{THRESH2}$ for a predetermined time period sufficiently long to indicate that the overcurrent condition has likely cleared, the overcurrent protection control circuit 56 automatically increases the variable threshold current magnitude back to $I_{THRESH1}$ (STEP 118). In any event, whether the overcurrent condition is cleared or not, the overcurrent protection control circuit 56 will automatically increase the variable threshold current magnitude back to $I_{THRESH1}$ after another predetermined time period, the so-called "soft hiccup" time period (STEP 116). This overcurrent protection scheme cycle will repeat if the overcurrent condition is still present.

Figure 3:
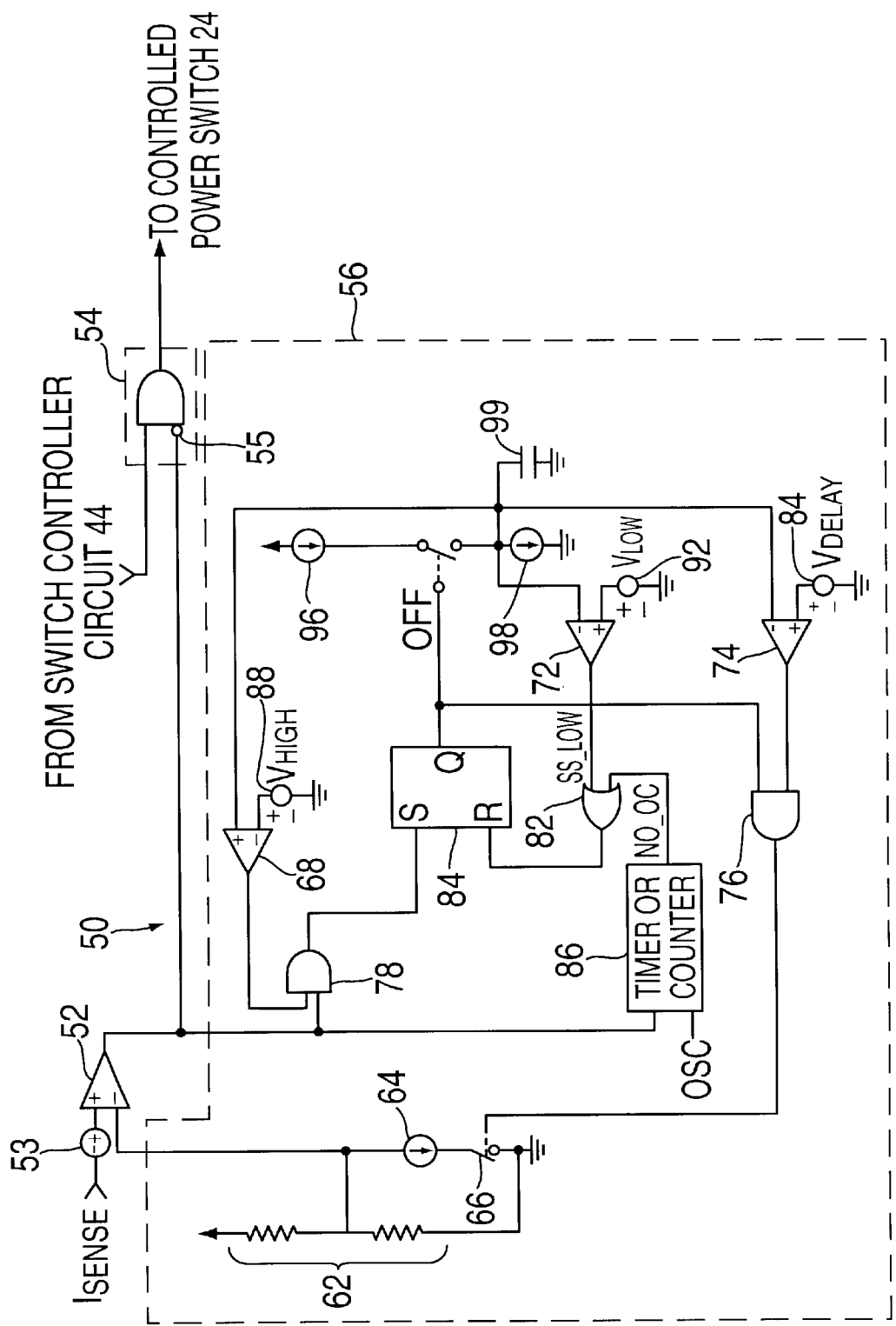
FIG. 3 is a detailed schematic diagram of the overcurrent protection circuit depicted in FIG. 2.

Turning now to FIG. 3, a more detailed description of one embodiment of the overcurrent protection circuit 50 for carrying out the soft hiccup current limiting method will be provided.

The comparator circuit 52 is implemented using a comparator circuit configuration. The comparator circuit 52 has its non-inverting input connected to receive the sensed current magnitude value, via an adjustable DC shift circuit 53, and its inverting input connected to receive the variable threshold current magnitude value from the overcurrent protection control circuit 56. Thus, with this configuration, the output of the comparator circuit will be "high" when the sensed current magnitude value exceeds the variable threshold current magnitude value. The purpose of the DC shift circuit 53 will be discussed more fully later.

The output control circuit 54 is implemented as a logic AND circuit, with an inverter 55 at one of its inputs. The input including the inverter 55 is connected to the output of the comparator circuit 52, and the other input is connected to the output of the switch controller circuit 44. The output of the output control circuit 54 is connected to the controlled power switch 24. Hence, the duty cycle of the controlled power switch 24 is controlled based upon the outputs of both the switch controller circuit 44 and the comparator circuit 52.

The overcurrent protection control circuit 56 supplies the variable threshold current magnitude to the inverting input of the comparator circuit 52 via a voltage divider network 62 (depicted as R1 and R2), a foldback current source 64, and a controlled switching device 66. The supplied threshold current magnitude depends on the position of the controlled switching device 66. More particularly, with the controlled switching device 66 in its "opened" position the threshold current magnitude supplied to the inverting input of comparator circuit 52 is determined solely by the voltage divider network 62. Conversely, with the controlled switching device 66 in its "closed" position the foldback current source 64 is placed in parallel with R2, and the threshold current magnitude is reduced. There are numerous and varied circuit configurations for carrying out the same functionality implemented by this circuit design. The circuit design described and depicted is only exemplary of one embodiment.

The remaining portion of the overcurrent protection control circuit 56 is realized using various functional circuit implementations. These circuits include first 68, second 72, and third 74 comparator circuits; first 76 and second 78 logic AND circuits; a logic OR circuit 82; a set-reset (S/R) latch 84; a programmable timer or counter circuit 86 (including an input from a non-illustrated oscillator); first 88, second 92, and third 94 reference voltage supplies; first 96 and second 98 current sources; and a capacitor 99. The individual circuit interconnections of the overcurrent protection control circuit 56 are readily apparent from the depicted figure and will therefore not be described in detail. Rather, the operation of the entire overcurrent protection circuit 50 is best understood by discussing its operation under various conditions.

Figure 4:
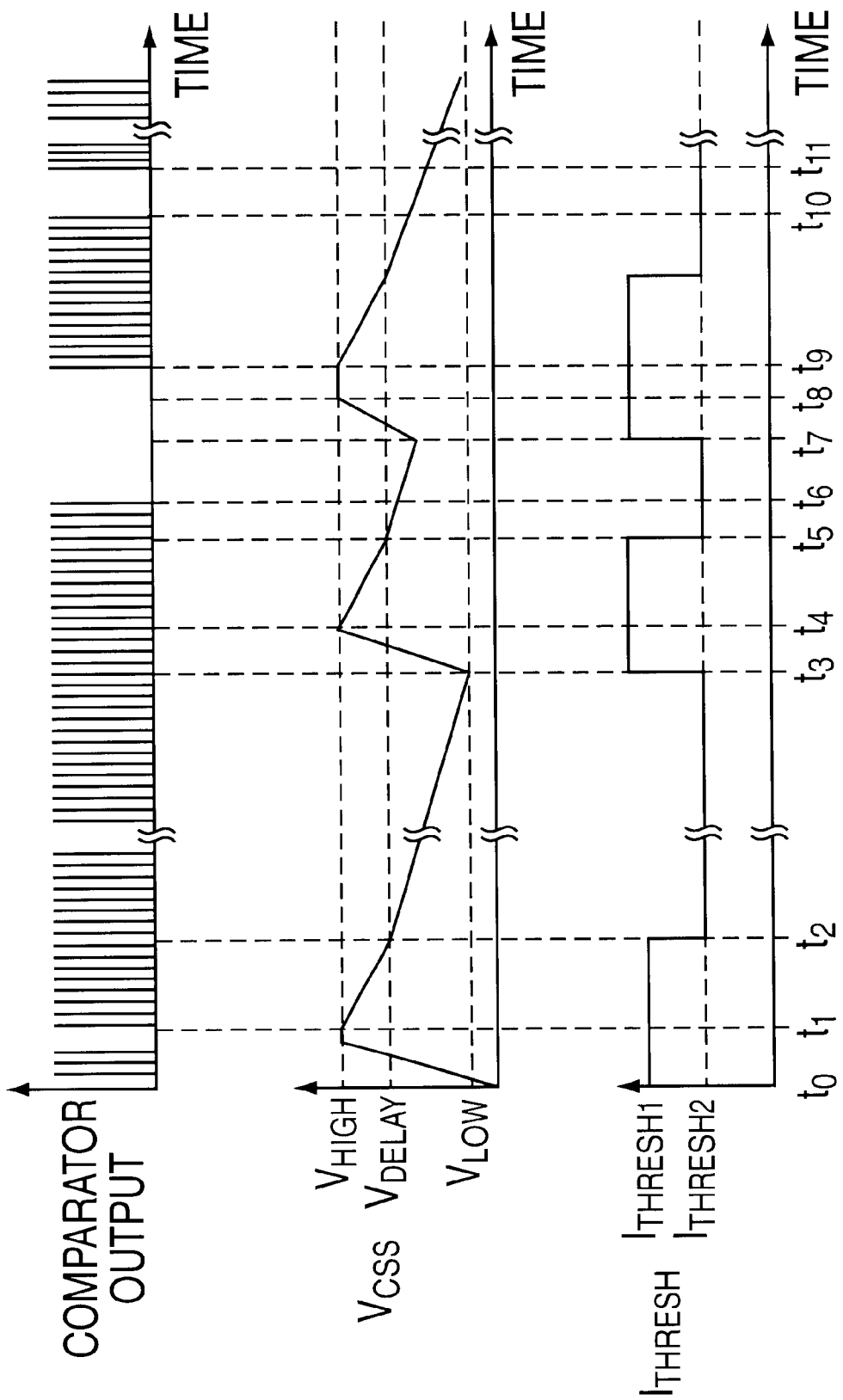
FIG. 4 depicts various typical waveforms associated with the overcurrent protection circuit depicted in FIG. 3.

Referring now to FIGS. 1, 3 and 4 together, when the power supply 10 is first energized, at time to, a momentary overcurrent condition may occur. This is typically a rapid transient and should, therefore, not implement the so-called "soft hiccup," whereby the threshold current magnitude is reduced. In this instance, because the capacitor 99 is still being charged toward the $V_{HIGH}$ reference voltage level, the output of the comparator circuit 68 will be low. Thus, the output of the AND circuit 78 will also be low, and will remain low. As a result, the variable threshold current magnitude will remain at the higher first value ($I_{THRESH1}$)

At time $t_1$ an overcurrent condition again occurs, thus causing the comparator circuit 52 output to pulse high. At this point in time, the capacitor voltage ($V_{CSS}$) is fully charged to the $V_{HIGH}$ reference voltage level. Therefore, when the output of comparator circuit 52 goes high, the latch 84 output goes high, which removes the charge current source 96 from the capacitor 99 and allows the discharge current source 98 to ramp down $V_{CSS}$ toward the $V_{DELAY}$ reference voltage level. It should be appreciated that the magnitude of the charge current supplied by the charge current source 96 is greater than the magnitude of the charge current supplied by the discharge current source 98. This ensures that charge current source 96 will indeed charge the capacitor 99, when the capacitor 99 is coupled to the charge current source 96 output. Typically, though certainly no so limited, the magnitude of the current supplied by the charge current source 96 is about ten times greater than that of the discharge current source 98.

Returning now to the discussion of the waveforms depicted in FIG. 4, if the overcurrent condition were to clear during the delay time period it takes for the capacitor to ramp down to $V_{DELAY}$, and remain clear for a predetermined time period, as previously discussed, then the counter/timer 86 would output a NO_OC signal to reset the latch 84. As a result, the charge current source 96 would once again charge the capacitor 99 to $V_{HIGH}$. As previously mentioned, this delay time period prevents unnecessarily triggering the soft hiccup during short duration transients. Since, in the case depicted, the overcurrent condition persists beyond this delay time period, at time $t_2$ the discharge current source 98 pulls $V_{CSS}$ below $V_{DELAY}$, which causes the output of comparator circuit 74 to go high. Thus, since the outputs of both the latch 84 and the comparator circuit 74 are high, the output of the AND circuit 76 causes the switching device 66 to close, which, as discussed above, reduces the variable threshold current magnitude value to $I_{THRESH2}$.

At time $t_3$, the capacitor 99 has discharged all the way down to $V_{LOW}$ (i.e., the soft hiccup time has lapsed). As a result, comparator circuit 72 generates an SS_LOW signal to reset the latch 84. Thus, the capacitor 99 is once again charged to $V_{HIGH}$ via the charge current source 96. Simultaneously, since the output of the latch 84 is low, the controlled switching device 66 is opened. Therefore, the variable threshold current magnitude value is increased to $I_{THRESH1}$.

The capacitor 99 is fully charged to $V_{HIGH}$ at time $t_4$; however, with the overcurrent condition still present, and for longer than the delay time, at time $t_5$ the variable threshold current magnitude is again reduced to $I_{THRESH2}$, and the capacitor 99 is again discharged toward $V_{LOW}$.

At time $t_6$ the overcurrent condition is cleared and remains cleared for at least the predetermined time period (from $t_6$ to $t_7$). After the predetermined time period, the timer/counter 86 outputs the NO_OC signal, and resets the latch 84. As a result, the variable threshold current magnitude value is returned to $I_{THRESH1}$ and the capacitor 99 is charged back toward $V_{HIGH}$. The skilled artisan will appreciate that this predetermined time period can be preset to any desired time to implement this function.

The overcurrent condition is still clear when the capacitor 99 is fully charged to $V_{HIGH}$ at time $t_8$. Thus, the power supply 10 returns to normal operation until time $t_9$, when another overcurrent condition occurs. This overcurrent condition causes the previously discussed cycle to once again occur, even though the overcurrent condition cleared for the period of time between $t_{10}$ and $t_{11}$. This is because the overcurrent condition cleared for a time period less than the predetermined time period set into the timer/counter 86. Nonetheless, thereafter the overcurrent protection cycle repeats as previously discussed herein above.

As previously mentioned, the DC shift circuit 53 is placed between the sensed current magnitude input and the non-inverting input of the comparator circuit 52. This is done in order to accommodate the conventional hiccup overcurrent protection scheme. If it is desired to implement the conventional hiccup scheme, the DC shift circuit 53 is adjusted to provide a DC voltage that is greater than the saturation voltage of the foldback current source 64. With the DC shift circuit 53 implemented as such, the power supply will be completely turned off when the controlled switching device 66 is closed.

While depicted and described as discrete functional circuits, the entire overcurrent protection control circuit could be implemented on a single integrated circuit.

We claim:

1. A method of overcurrent protection for a switch-mode power supply comprising:
   clamping peak power supply current to a first predetermined level in response to a sensed current magnitude being greater than or equal to a threshold current magnitude of a first value;
   reducing the threshold current magnitude from the first value to a second value in response to the sensed current magnitude being greater than or equal to the first value for a first predetermined period of time;
   clamping the peak power supply current to a second predetermined level in response to the sensed current magnitude being greater than or equal to the second value; and
   increasing the threshold current magnitude from the second value to the first value after a second predetermined period of time,
   wherein the first predetermined period of time is a time for a capacitor to discharge from a first reference voltage level to a second reference voltage level, and the second predetermined period of time is a time for the capacitor to discharge from the second reference voltage level to a third reference voltage level.

2. A method of overcurrent protection for a switched mode power supply, comprising:
   clamping peak power supply current to a first predetermined level in response to a sensed current magnitude being greater than or equal to a threshold current magnitude of a first value;
   reducing the threshold current magnitude from the first value to a second value in response to the sensed current magnitude being greater than or equal to the first value for a first predetermined period of time; and
   clamping the peak power supply current to a second predetermined level in response to the sensed current magnitude being greater than or equal to the second value;

increasing the threshold current magnitude from the second value to the first value in response to the sensed current magnitude being less than the second value for a third predetermined period of time.

3. A method of overcurrent protection for a switch-mode power supply according to claim 2, wherein the third predetermined period of time is a time it takes for a counter device to generate a predetermined number of counts at a fixed frequency.

4. A method of overcurrent protection for a switched mode power supply according to claim 2, wherein clamping peak power supply current comprises reducing a duty cycle of a controlled switching device.

5. A method of overcurrent protection for a switch-mode power supply according to claim 2, wherein the first predetermined period of rime is a time for a capacitor to discharge from a first reference voltage level to a second reference voltage level.

6. A method of overcurrent protection for a switch-mode power supply according to claim 2, further comprising preventing the reducing of the threshold current magnitude from the first value to the second value during a power supply startup time period.

7. A method of overcurrent protection for a switch-mode power supply according to claim 6, wherein the power supply startup time period is a time for a capacitor to charge from zero volts to a first reference voltage level.

8. An overcurrent protection circuit for a switch-mode power supply comprising:
   a comparator circuit including at least a first input connected to receive a sensed current magnitude and a second input connected to receive a variable threshold current magnitude; and
   a first control circuit configured to selectively switch the variable threshold current magnitude between a first value and a second value that is less than the first value in response to the sensed current magnitude being greater than or equal to the first value for a first predetermined period of time,
   wherein the first control circuit switches the variable threshold current magnitude from the second value to the first value in response to the sensed current magnitude being less than the second value for a third predetermined period of time.

9. An overcurrent protection circuit for a switch-mode power supply comprising:
   a comparator circuit including at least a first input connected to receive a sensed current magnitude and a second input connected to receive a variable threshold current magnitude;
   a first control circuit configured to selectively switch the variable threshold current magnitude between a first value and a second value that is less than the first value in response to the sensed current magnitude being greater than or equal to the first value for a first predetermined period of time; and
   an adjustable DC shift circuit connected to said first input of said comparator circuit.

10. An overcurrent protection circuit for switch-mode power supply comprising:
    a comparator circuit including at least a first input connected to receive a sensed current magnitude and a second input connected to receive a variable threshold current magnitude;
    a first control circuit configured to selectively switch the variable threshold current magnitude between a first value and a second value that is less than the first value in response to the sensed current magnitude being greater than or equal to the first value for a first predetermined period of time;
    a second control circuit coupled to at least an output of said comparator circuit, said second control circuit belong controlled by said comparator circuit to clamp peak power supply output in response to the sensed current magnitude exceeding the variable threshold current magnitude,
    wherein the first control circuit switches the variable threshold current magnitude from the first value to the second value in response to the sensed current value threshold current magnitude for a first predetermined period of time, and
    wherein the first control circuit switches the variable threshold current magnitude from the second value to the first value after either a second predetermined period of time or in response to the sensed current magnitude being less than the second value for a third predetermined period of time; and
    an adjustable DC shift circuit connected to said first input of said comparator circuit.

11. An overcurrent protection circuit for a switch-mode power supply according to claim 10, wherein said first control circuit prevents said second control circuit from clamping the peak power supply current during a startup time period.

* * * * *